United States Patent Office 3,490,305
Patented Jan. 20, 1970

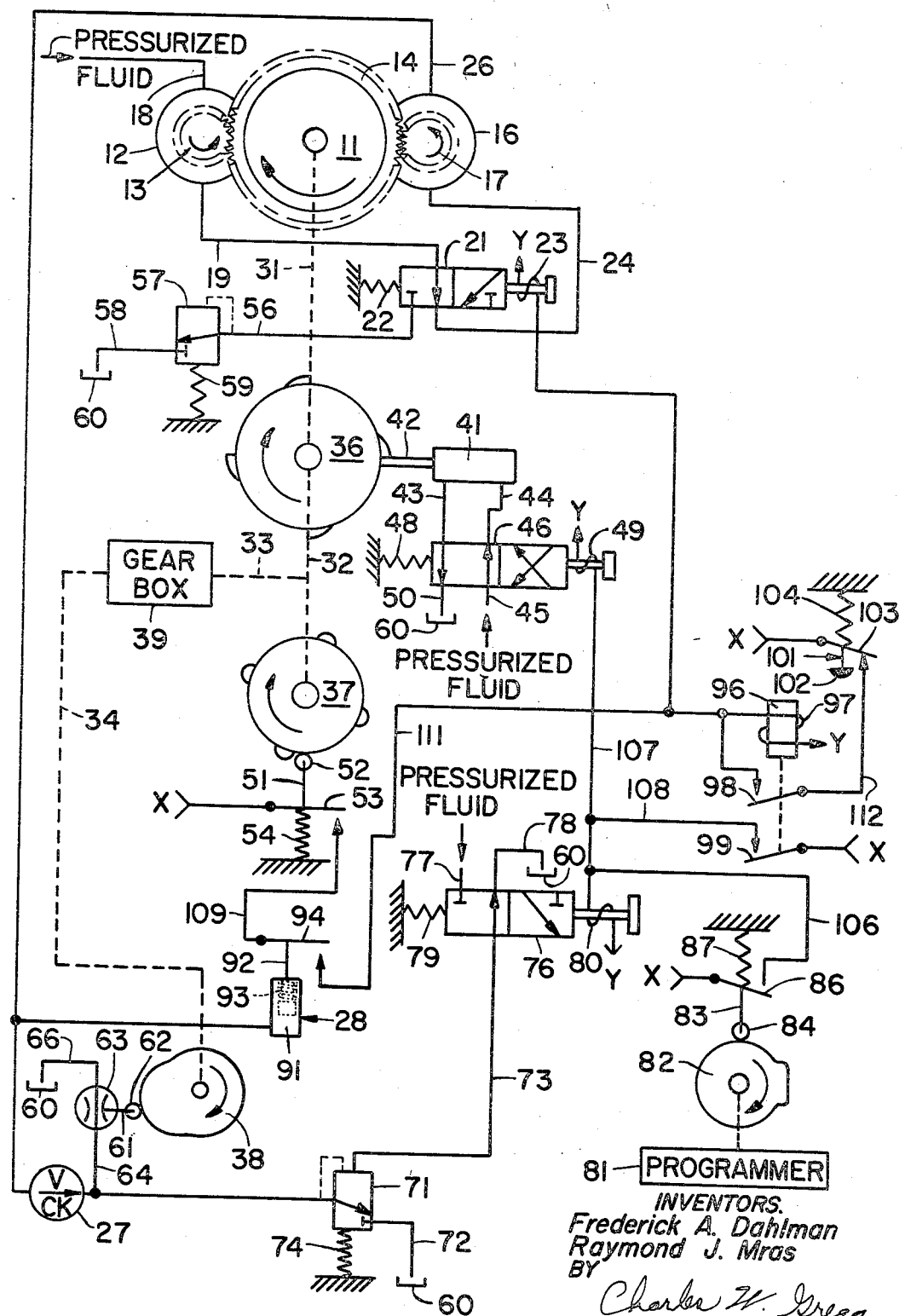

3,490,305
ANTIBACKLASH DRIVE SYSTEM
Frederick A. Dahlman and Raymond J. Mras, Corning, N.Y., assignors to Corning Glass Works, Corning, N.Y., a corporation of New York
Filed July 2, 1968, Ser. No. 741,917
Int. Cl. F16h 55/18
U.S. Cl. 74—409                        8 Claims

ABSTRACT OF THE DISCLOSURE

A system for driving a mechanism or device, including periodic acceleration and deceleration of such device, with maximum possible elimination of backlash and the detrimental effects of shake and vibration resulting from backlash which normally exists in a drive system due to necessary clearance in gear teeth, linkages and other components of such a system. The drive system comprises a first pressurized fluid or hydraulic apparatus or machine for imparting the driving motion to the driven mechanism or device and a second similar apparatus or machine for braking or stopping the device. An emergency braking or stopping arrangement incorporated in the system prevents damage to the equipment or injury to personnel in the event the braking apparatus should become non-functional due to bursting of a pressurized fluid conduit or failure of a coupling or other component associated with the braking apparatus.

BACKGROUND OF THE INVENTION

Drive systems inherently embody a certain amount of backlash during acceleration and deceleration of the devices or mechanisms being driven and many apparatus arrangements have been devised for eliminating, to the extent possible, such backlash. In drive systems in which a device or mechanism is periodically and rapidly indexed or driven at very frequent intervals between a number of positions at each of which the device or mechanisms is brought to a stop, acceleration and deceleration of the device when leaving and approaching said positions causes considerable backlash and, therefore, the driven devices or mechanisms and the other components of such drive systems are subjected to extreme vibration and resultant wear of such components. It is, therefore, an object of the present invention to provide a drive system in which backlash is eliminated to a substantial extent. Such drive system is especially adaptable or useful for driving devices or machines of the above-mentioned indexing type but is not intended to be confined to such usage.

SUMMARY OF THE INVENTION

In practicing the present invention, there is provided a first machine which is driven by pressurized fluid supplied thereto and which is mechanically connected in a driving relationship with the device or mechanism to be driven and acts as a prime mover for such device or mechanism. The fluid discharge port of said first machine is connected with the fluid input port of a second similar fluid machine which is mechanically connected with said device or mechanism in the same manner that said first machine is connected thereto. Such second fluid machine thereby acts as a hold-back for the driven device or mechanism and substantially eliminates backlash in the drive system. The input port of a pressure switch is connected to the discharge port of said second fluid machine and, upon such switch failing to detect sufficient pressure, such as may be due to a leaking or broken pressurized conduit for example, the fluid discharge from said discharge port of the first pressurized fluid machine is directed to an emergency brake valve which supplies sufficient back pressure to said discharge port of the first machine to convert such machine from a prime mover to a braking device.

BRIEF DESCRIPTION OF THE DRAWING

The single drawing figure comprises a schematic diagram of a drive system embodying the invention.

PREFERRED EMBODIMENT OF THE INVENTION

Referring to the drawing in detail, there is shown a device or mechanism 11 which is to be driven, for example, in a clockwise rotary path of movement as indicated by the arrow on such device or mechanism. A first pressurized fluid or hydraulically actuated machine 12 is illustrated as being provided with a pinion gear 13 having gear teeth cooperatively meshing with gear teeth on a spur gear 14 securely connected in any convenient manner to device or mechanism 11. A second fluid or hydraulic machine 16 is illustrated as being provided with a pinion gear 17 whose gear teeth also cooperatively mesh with the gear teeth of spur gear 14. Pressurized fluid from a source thereof is provided through a conduit 18 to the input port of machine 12. Such fluid source is not shown in the drawings for purposes of simplification thereof; however, such pressurized fluid may, for example, be high pressure hydraulic oil.

The discharge port of machine 12 is connected to one end of a conduit 19 whose other end is connected to one end of a gating means or valve 21 which is a two-position, three-way valve that is normally maintained in a first position by a compression spring 22 connected thereto. Such gating means or valve is shown as an electrical solenoid valve which is actuated to its second position when the control winding 23 thereof is energized and is returned to its normal position by spring 22 when control winding 23 is again de-energized following a period of energization thereof. The input port of machine 16 is connected to one end of a conduit 24 whose other end is connected to said one end of gating means or valve 21. The discharge port of machine 16 is connected to one end of a conduit 26 whose other end connects to a first or the input side of a check valve 27 and to the input of a pressure switch 28 to be hereinafter discussed.

Machines 12 and 16 may each be a hydraulic motor such as, for example, a Staffa Mark 7-SU Hydraulic Motor which is manufactured by Chamberlain Industries, London, England, and which is sold and distributed in the United States by Double A Products Company, Manchester, Mich. Such motors are described in a Bulletin No. PP5 which is published by the Double A Products Company and available therefrom. However, hydraulic motors such as may be used for machines 12 and 16 are well known and, as is believed apparent, the output shafts of such motors are rotatively driven by pressurized fluid supplied to the input ports of the motors. It is again pointed out that machine 12 is used as a driving machine or prime mover while machine 16 is employed as a hold-back or braking machine. It was therefore chosen to term both the prime mover and the hold-back as machines rather than motors since they are identical to each other and, as employed in the invention, machine 16 does not act as a motor or prime mover.

As indicated in the conventional manner by dotted lines 31 and 32, a ratchet wheel 36 and a cam means, comprising a cam wheel 37, are connected to mechanism 11 for corresponding driven rotation of such wheels by such mechanism. As also indicated in the conventional manner by dotted lines 33 and 34, a cam means 38 is connected through a step-up gear box 39 to mechanism 11 for driven rotation with such mechanism. Gear box 39 has a 4 to 1 step-up gear ratio and, therefore, cam means 38 rotates once for each quarter revolution or rotation of mechanism 11 or wheels 36 and 37.

A reciprocating pressurized fluid motor 41 is provided and includes the usual piston rod 42 whose free end acts as a detent for ratchet wheel 36. Fluid conduits 43 and 44 connect first and second ends of the cylinder of motor 41 to a first end of a two-position, four-way gating means or valve 46 which is normally maintained in a first position by a compression spring 48 connected thereto. Such gating means or valve is shown as an electrical solenoid valve which is actuated to its second position when the control winding 49 thereof is energized, and is returned to its normal position by spring 48 when control winding 49 is again de-energized following a period of energization thereof. Said first end of valve 46 is also connected through a conduit 50 to a suitable fluid sink or tank 60, and through a conduit 45 to the previously-mentioned or another source of pressurized fluid.

Associated with cam wheel 37 is a cam follower 51 having a roller 52 pivotally mounted on one end thereof and bearing against the outer periphery of cam wheel 37. The other end of cam follower 51 is connected to an electrical circuit controlling contact or switch 53 which is normally biased to an open position by a compression spring 54 and which also maintains roller 52 against the outer periphery of cam wheel 37. The purpose of electrical contact or switch 53 will be discussed hereinafter.

The first side of previously-mentioned valve or gating means 21 is also connected to a first end of a conduit 56 whose second end connects to the input of a pressure relief valve 57 whose output connects through a conduit 58 to the previously-mentioned fluid sink or tank 60. Valve 57 includes a compression spring 59 which holds such valve closed when the pressure of the pressurized fluid in conduit 56 and supplied to the valve is below a predetermined value of pressure.

Associated with the previously-mentioned cam means 38 is a cam follower 61 having a roller 62 pivotally mounted on one end thereof and which bears against the outer periphery of cam means 38. The other end of cam follower 61 is connected to a deceleration or variable fluid flow control valve 63 for variable actuation of such valve. The input of valve 63 is connected by a conduit 64 to the second end or outlet side of previously-mentioned check valve 27 and to one input of a by-pass valve 71 discussed below. The output of valve 63 is connected by a conduit 66 to the previously-mentioned sink or tank 60.

The above-mentioned by-pass valve 71 is similar to valve 57 previously discussed and has an output connected by a conduit 72 to the previously-mentioned fluid sink or tank 60. A first end of a conduit 73 also connects to valve 71, the second end of such conduit being connected to a first end of a two-position, three-way solenoid actuated valve 76 discussed hereinafter. Valve 71 includes a compression spring 74 which holds such valve closed until the pressure supplied to the valve through conduit 64 exceeds a predetermined value, or until valve 76 is actuated to supply pressure through conduit 73 to the valve.

A first end of solenoid operated valve 76 mentioned above is connected through a conduit 77 to the previously-mentioned source of pressurized fluid and through a conduit 78 to said sink or tank 60. Valve 76 includes a compression spring 79 which normally maintains the valve in a first position. Such valve is actuated to its second position when the control winding 80 thereof is energized as hereinafter discussed and is returned to its said first position by spring 79 when said control winding is again de-energized following a period of energization thereof.

There is also shown in the drawing a cam wheel 82 of a timing mechanism or programmer 81 of any suitable type. Such timing mechanisms or programmers are well known in the art and are employed for actuating devices in a selected time sequence. Cam wheel 82 is rotated clockwise by the programmer, as indicated by the arrow thereon, and periodically actuates a cam follower 83 through means of a roller 84 pivotally mounted on one end of such roller and bearing against the outer periphery of cam wheel 82. The periods of actuation of cam follower 83 are dependent, of course, on the speed of rotation of cam wheel 82 which is selected in accordance with the speed of the operating cycles desired for mechanism 11. This will become apparent hereinafter.

The second end of cam follower 83 is connected to an electrical circuit controlling contact or switch 86. A spring 87 normally biases contact or switch 86 to open position and at the same time causes roller 84 to continuously bear against the outer periphery of cam wheel 82. The purpose of contact or switch 86 will be discussed hereinafter in the description.

The previously-mentioned pressure switch 28 has its input connected to conduit 26 which is also connected to the discharge port of machine 16 as also previously mentioned. Pressure switch 28 includes a cylinder 91 and a piston and piston rod assembly 92. A compression spring 93 surrounds the piston rod within cylinder 91 and biases the piston and piston rod assembly 92 to a retracted position within cylinder 91 when the pressure in conduit 26 is below a selected value. The otherwise free end of the piston rod is connected to an electrical circuit controlling contact or switch 94 which is held in its open position shown when the pressure in conduit 26 is at or above said selected value. When, of course, said pressure is below said selected value, electrical contact or switch 94 is actuated to a closed position by the force of spring 93.

A source of electrical current of suitable voltage and capacity is provided for energization of the solenoids of valves 21, 46 and 76. The first and second terminals of said source are designated as X and Y, respectively, however, said source is not shown in the drawing for purposes of simplification thereof. An electrical relay 96 having a control winding 97 is also provided and includes a pair of electrical circuit controlling contacts 98 and 99 which are normally in their open positions shown when control winding 97 is de-energized and which are actuated to their circuit closing positions when such winding is energized as discussed below. There is also provided a manually operated electrical circuit controlling reset switch 101 including a push button 102 connected to a normally closed electrical contact 103 of the switch. Contact 103 is normally biased to its closed position by a compression spring 104 connected thereto and such contact is actuated to its open position when push button 102 is manually depressed. The purpose of reset switch 101 is discussed below.

Having described the electrically-controlled components employed, a brief discussion of the circuits connected thereto will be given.

The solenoid windings 49 and 80 of valves 46 and 76, respectively, have a first energizing circuit which extends from terminal X of said current source over contact or switch 86 when such contact or switch is actuated to its closed position by cam wheel 82, thence over electrical conductors 106 and 107 to said solenoid windings and through such windings to terminal Y of said current source. Such windings also have a second energizing circuit which extends from said terminal X over contact 99 of relay 96 in its closed position and thence over conductor 108 to conductor 107. It is, therefore, apparent that solenoid windings 49 and 80 are energized whenever cam wheel 82 actuates its associated contact 86 to a closed position or whenever the control winding 97 of relay 96 is energized to actuate such relay.

Solenoid winding 23 of valve 21 and control winding 97 of relay 96 have a first energizing circuit which may be traced from terminal X of said current source, over contact or switch 53 associated with cam wheel 37, electrical conductor 109, contact or switch 94 or pressure switch 28, conductor 111, and thence through the control windings 23 and 97 of valve 21 and relay 96, respectively, to terminal Y of the current source. Said windings are provided with a second energizing circuit which may be traced from terminal X of the source of current over contact 103 of reset switch 101, electrical conductor 112, contact 98 of relay 96 and thence to said electrical conductor 111 and said control windings 23 and 97. It is thus apparent that control windings 23 and 97 are energized whenever cam wheel 37 actuates its associated contact 53 to a closed position and the pressure in conduit 26 is sufficiently low that pressure switch 28 actuates its contact 94 to a closed position. Once said windings are so energized, they are maintained energized by the holding circuit to the control winding 97 of relay 96, including contact 98 of such relay and contact 103 of reset switch 101, until the push button 102 of switch 101 is depressed to open its contact 103 and again de-energize to control winding 97 of relay 96 to cause contact 98 of such relay to then open and interrupt the holding circuit.

It is believed that the apparatus arrangement shown in the drawing will now best be understood by reference to the operational examples of the invention which follow.

Referring to the drawing in detail, it will first be assumed that cam wheel 37, pressure switch 28, relay 96, valves 21 and 57, and the electrical circuits and apparatus associated with such components are not included in the system since these items are related to the previously-mentioned emergency braking or stopping arrangement and are not an essential part of the antibacklash drive system per se but, of course, are highly desirable in such a system. The operation of such arrangement will be discussed hereinafter. It is pointed out that, under such assumption, conduit 19 is connected directly with conduit 24.

It will now be assumed that programmer 81 is driving cam wheel 82 so that the such wheel is rotating in a clockwise direction at a predetermined speed. Each time the cam of such cam wheel contacts roller 84 and actuates cam follower 83, electrical contact or switch 86 is closed to complete the energizing circuit for the winding 49 of the solenoid of valve 46. Further assuming that pressurized fluid at a relatively high pressure is supplied to the input port of motor or machine 12, such machine is attempting to operate to drive mechanism 11 in a clockwise direction but such mechanism is, as illustrated in the drawing, locked against such movement by piston rod or detent 42 of motor 41 being in contact with a tooth of ratchet wheel 36. When, however, the cam on cam wheel 82 in its rotation causes said electrical circuit through contact 86 to close, winding 49 is energized and valve 46 is actuated to its second position. Pressurized fluid is then supplied to the lefthand side (viewing the drawing) of fluid motor 41 while conduit 44 is connected through valve 46 to conduit 50 and thence to tank 60. The piston of motor 41 actuates piston rod or detent 42 to withdraw from contact with the tooth on ratchet wheel 36 at such time. At the same time that the energizing circuit to winding 49 of valve 46 is closed, the energizing circuit to winding 80 of valve 76 is also closed. This actuates such valve to connect pressurized fluid to conduit 73 to, in turn, actuate bypass valve 71 to connect conduit 64 and, thereby, the outlet side or second end of check valve 27 to tank 60. This relieves a substantial part of the back pressure on the output port of machine 16 and permits mechanism 11 to be rotatively driven by machine 12.

Shortly following the initiation of the rotation of mechanism 11, the cam on cam wheel 82 permits contact or switch 86 to open to de-energize windings 49 and 80 of valves 46 and 76. Detent 42 is then reactuated to its position shown to engage the next tooth on ratchet wheel 36 when mechanism 11 has rotated sufficiently to bring such tooth into engagement position. At the same time, valves 76 and 71 are actuated to terminate the connection of conduit 64 to tank 60.

As previously mentioned, cam wheel 38 is rotated a full revolution for every quarter revolution of mechanism 11. Therefore, when mechanism 11 rotates sufficiently that one of the teeth on cam wheel 36 approaches detent 42, roller 62 on cam followed 61 is actuated by the high side of cam wheel 38 to slowly and progressively close variable fluid-flow control valve 63 and, thereby gradually cut off fluid flow therethrough to tank 60. Such actuation of valve 63 causes back pressure to gradually build up in conduit 26 and at the output port of machine 16. Thus, rotation of machine 16 is gradually retarded as said tooth on cam wheel 36 approaches detent 42 and as machine 16 gradually imparts an increasing braking force to mechanism 11 at such time. Mechanism 11 is, thereby, brought to a relatively smooth stop with detent 42 finally contacting the previously-approaching tooth on ratchet wheel 36.

It is pointed out the cam wheel 38 has a configuration and is so arranged in relationship with roller 62 of cam follower 61 associated with variable fluid-flow control valve 63, that valve 63 closes at a relatively gradual rate when ratchet wheel 36, and thereby mechanism 11, approach the stop positions but so that valve 63 opens at a relatively fast rate following the release of ratchet wheel 36 by the actuation of detent 42. This provides for relatively rapid acceleration of mechanism 11 and relatively gradual deceleration of such mechanism to attain a rapid but relatively smooth indexing of the mechanism between its stop positions. It is also pointed out that tank 60 shown at various locations in the drawing is preferably a supply reservoir or tank in a closed fluid supply system which supplies a source from which a suitable pump can obtain fluid for pressurization for supply to the various components. However, if desired for any reason, tank 60 can be a suitable fluid sink as previously mentioned. It should also be pointed out that the pressurized fluid supplied to valve 46 can, if desired, be a source of aeriform pressurized fluid such as compressed air and, under such conditions, conduit 50 can be vented to atmosphere rather than to tank 60. Check valve 27 is provided so that a minimum amount of back pressure, such as, for example 50 p.s.i., pressure is supplied to the output port of machine 16 at all times. This provides for the anti-backlash characteristics of the invention since such back pressure causes machine 16 to supply at least a minimum holdback force to mechanism 11 and thence to machine 12 at all times. Such characteristics will be apparent to those skilled in the art after a brief review of this description taken in conjunction with the drawing.

The operation of the apparatus without the previously-mentioned emergency braking system having thus been described, the operation of a system such as shown in the drawings and including such emergency system will now be discussed.

It will first be assumed that pressure switch 28 actuates electrical contact or switch 94 to its closed position whenever the pressure supplied to such switch over conduit 26 falls below 100 p.s.i., for example. Such pressure must be higher than the minimum pressure maintained in conduit 26 by check valve 27, which is a minimum of 50 p.s.i. as previously mentioned. In other words, pressure switch 28 must actuate contact 94 to its closed position when pressure in conduit 26 falls below a selected pressure somewhat higher than 50 p.s.i., otherwise the emergency braking system may not operate properly under some conditions. If, for example, pressure switch 28 was set to actuate contact 94 to its closed position when the pressure in conduit 26 fell somewhat below 50 p.s.i. and conduit 26 burst under such conditions, such switch would properly operate contact 94. However, if, for example, conduit 24 burst at such time, pressure switch 28 would not then actuate contact 94 to its closed position since the pressure in conduit 26 is maintained at 50 p.s.i. by check valve 27. Therefore, emergency braking would not result under the last described conditions. Since, however, the pressure in conduit 26 is at times below the arbitrarily selected 100 p.s.i. pressure during the normal cycles of the operation of the drive system, it must be assured that emergency braking is not effected by the closing of contact 94 during such normal operating cycles but only during an emergency such as described above. Cam wheel 37 is provided, therefore, to permit operation of the emergency braking system only when, during the normal cycles of operation of the apparatus, the pressure in conduit 26 is normally at or above 100 p.s.i.

As illustrated in the drawing, contact 94 of pressure switch 28 is in its normally open position because valve 63 is substantially closed and, therefore, the back pressure in conduit 26 is appproximately at its maximum which is well above 100 p.s.i. When mechanism 11 is approximately midway between its stop positions, valve 63 is in its fully open position. The back pressure in conduit 26 is then well below 100 p.s.i. and contact 94 of pressure switch 28 is closed. However, at such time, contact 53 associated with cam 37 is open and no actuation of the emergency braking apparatus or system occurs.

It will now be assumed that a fault occurs in the drive system and, therefore, an emergency condition exists. Such emergency condition may result, for example, from the bursting of conduits 24, 26 or 64, for example, or from the bursting of valves 63, 27 or 71 for further example, or for numerous other apparent reasons. Under such conditions, back pressure on machine 16 could be sufficiently reduced or lost so that no braking or holdback of mechanism 14 would occur thereby resulting in damage to the apparatus of the drive system. In addition, the high pressure fluid flowing under such conditions could, besides causing a considerable down-time for cleaning up of equipment and its location, endanger personnel and perhaps cause damage to neighboring apparatus or equipment. It is, therefore, highly desirable that the emergency braking system described be provided.

When a fault such as mentioned above occurs and contact 94 of pressure switch 28 becomes closed, due to the pressure in conduit 26 and supplied to such switch falling below 100 p.s.i., when the next cam on cam wheel 37 contacts roller 52 during the revolution of such cam wheel (assuming that roller 52 is not already contacted by such a cam at the time contact 94 is actuated to its closed position) roller 52 actuates cam follower 51 to close contact 53 and complete the previously-described energizing circuits to control winding 97 of relay 96 and to winding 23 of the solenoid of valve 21. Relay 96 is thereby energized to close its holding circuit including its own contact 98 and contact 103 of reset switch 101. Such holding circuit also maintains winding 23 of the solenoid of valve 21 energized. The energization of relay 96 also closes contact 99 of such relay which, in turn, closes the energizing circuits to windings 49 and 80 of the solenoids of valves 46 and 76, respectively. Such energizing of windings 49 and 80 actuates the respective valves 46 and 76 to, in turn, actuate detent 42 to its retracted position and valve 71 to its fluidflow position. Damage to detent 42 or ratchet wheel 36 is thereby prevented while the actuation of valve 71 releases to tank 60 any pressurized fluid in conduit 64 at such time. The above-mentioned energization of winding 23 of the solenoid of valve 21 actuates such valve to connect the discharge port of machine 12 to conduit 56 and, thereby, to pressure release valve 57 to provide a sufficient back pressure to said discharge port to impart braking to machine 12 and, thereby, to mechanism 11. Thus, under said emergency conditions, machine 12 is utilized as a braking device for mechanism 11.

After the fault which caused the operation of the emergency braking system is corrected and repaired, and the equipment otherwise again placed in operating condition, push button 102 of spring return reset switch 101 is momentarily depressed, thereby opening the holding circuit to relay 96. Such relay is thus released thereby de-energizing windings 23, 49 and 80 of the solenoids of valves 21, 46 and 76, respectively. Such valves are then reactuated by their respective compression springs to the positions shown in the drawings.

Although there is herein shown and described only a single example of the apparatus embodying the invention, it will be understood that such is not to be considered in any way limiting but that various changes may be made in the system disclosed within the purview of the appended claims without departing from the spirit and scope of the invention.

What is claimed is:

1. In a drive system in which a mechanism is driven by a prime mover comprising a pressurized-fluid actuated machine whose output shaft is mechanically connected with said mechanism, such machine including a pressurized-fluid input port and a discharge port, the improvement comprising:
   (A) a second machine identical to the first pressurized-fluid actuated machine, such second machine mechanically connected with said mechanism identical to such first machine;
   (B) fluid conduit means connecting said discharge port of said first machine with the input port of said second machine, and
   (C) a check valve having its input port connected to the discharge port of said second machine, such check valve supplying a selected amount of back pressure to said second machine to substantially reduce or eliminate backlash in said drive system.

2. An antibacklash system for actuating or driving a mechanism, such system comprising, in combination:
   (A) a first pressurized-fluid driven machine mechanically connected with said mechanism in a driving relationship therewith, such machine including a fluid input port for connection to a source of pressurized fluid and a fluid discharge port;
   (B) a second machine identical to said first machine and connected with said mechanism in a manner identical to that in which said first machine is so connected, the fluid discharge port of such second machine being connected to the input side of a check valve which opens only at a preselected value of pressure; and
   (C) fluid conduit means connecting said discharge port of said first machine with the fluid input port of said second machine, whereby said second machine acts as a hold-back device for said mechanism.

3. A system in accordance with claim 2 and in which said fluid conduit means includes a fluid diverter valve which is normally biased to a first position to connect said discharge port of said first machine with said fluid input port of said second machine and is actuable to a second position to connect such discharge port to the input of a pressure relief valve, such system further including:
   (D) a pressure switch having its input connected in multiple with said input side of said check valve, such switch normally maintained in a selected position by the pressure of the fluid supplied to said input of the valve and actuable away from said selected position when said fluid pressure reduces below a predetermined value of pressure greater than said preselected value of pressure;
   (E) first and second cam means operated in synchronism with said mechanism;
   (F) a normally open variable fluid-flow control valve connected to the outlet side of said check valve, such control valve progressively actuable by said first cam means towards a closed position as said mechanism is driven towards a selected position by said first machine;
   (G) means controlled by said pressure switch and said second cam means for actuating said diverter valve to its said second position when such pressure switch is actuated away from its said selected position and said variable control valve has been actuated to a preselected degree of closure by said first cam means;

(H) fluid-gating means connected to the output side of said check valve in multiple with said fluid-flow control valve, such gating means normally being in a fluid-flow blocking condition and actuable to a second condition to permit fluid flow therethrough;

(I) a programmer, and (J) timing means operated by said programmer for periodically actuating said fluid-gating means to said second condition.

4. A system in accordance with claim 3 and further including detent means for temporarily locking said mechanism in said selected position when such mechanism has reached such position during its actuation, such detent means being actuated by said timing means to release said mechanism simultaneously with the actuation of said fluid gating means to said second condition.

5. A system in accordance with claim 4 and in which said detent means comprises a ratchet wheel operated in synchronism with said mechanism and a detent actuable between first and second positions for engaging and disengaging the teeth of such ratchet wheel.

6. A system in accordance with claim 2 and further including:

(D) cam means operated in synchronism with said mechanism;

(E) a normally open variable fluid-flow control valve connected to the output side of said check valve, such control valve progressively actuable by said cam means towards a closed position as said mechanism is driven towards a selected position by said first machine;

(F) fluid-gating means connected to the output side of said check valve in multiple with said fluid-flow control valve, such gating means normally being in a fluid-flow blocking condition and actuable to a second condition to permit fluid-flow therethrough;

(G) a programmer, and (H) timing means operated by said programmer for periodically actuating said fluid-gating means to said second condition.

7. A system in accordance with claim 6 and further including detent means for temporarily locking said mechanism in said selected position when such mechanism has reached such position during its actuation, such detent means being actuated by said timing means to release said mechanism simultaneously with the actuation of said fluid-gating means to said second condition.

8. A system in accordance with claim 7 and in which said detent means comprises a ratchet wheel operated in synchronism with said mechanism and a detent actuable between first and second positions for engaging and disengaging the teeth of said ratchet wheel.

References Cited
UNITED STATES PATENTS

| | | | |
|---|---|---|---|
| 3,166,952 | 1/1965 | Lang | 74—409 X |
| 3,174,351 | 3/1965 | Spencer | 74—409 |
| 3,238,730 | 3/1966 | Webb | 74—409 X |

LEONARD H. GERIN, Primary Examiner

U.S. Cl. X.R.
74—84, 814